(12) United States Patent
Lee

(10) Patent No.: US 10,521,141 B2
(45) Date of Patent: Dec. 31, 2019

(54) MEMORY MODULE AND METHOD SYSTEM INCLUDING THE SAME

(71) Applicant: SK hynix Inc., Gyeonggi-do (KR)

(72) Inventor: Jae-Young Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 313 days.

(21) Appl. No.: 15/587,507

(22) Filed: May 5, 2017

(65) Prior Publication Data

US 2018/0088848 A1 Mar. 29, 2018

(30) Foreign Application Priority Data

Sep. 26, 2016 (KR) ........................ 10-2016-0122936

(51) Int. Cl.
| | |
|---|---|
| *G06F 3/06* | (2006.01) |
| *G06F 1/08* | (2006.01) |
| *G06F 11/10* | (2006.01) |
| *G06F 13/40* | (2006.01) |
| *G06F 13/42* | (2006.01) |

(52) U.S. Cl.
CPC ............. *G06F 3/0626* (2013.01); *G06F 1/08* (2013.01); *G06F 3/0619* (2013.01); *G06F 3/0625* (2013.01); *G06F 3/0659* (2013.01); *G06F 3/0661* (2013.01); *G06F 3/0685* (2013.01); *G06F 11/1076* (2013.01); *G06F 13/404* (2013.01); *G06F 13/4282* (2013.01); *Y02D 10/14* (2018.01); *Y02D 10/151* (2018.01)

(58) Field of Classification Search
CPC ...... G06F 1/08; G06F 13/404; G06F 11/1076; G06F 3/0685; G06F 13/4282; G06F 3/0626; G06F 3/0625; G06F 3/0619; G06F 3/0661; G06F 3/0659; Y02D 10/151; Y02D 10/14

See application file for complete search history.

(56) References Cited

U.S. PATENT DOCUMENTS

| | | | |
|---|---|---|---|
| 2004/0015691 A1* | 1/2004 | Collette | H04L 12/56 713/161 |
| 2006/0171683 A1* | 8/2006 | Battaglia | G11C 5/141 386/224 |
| 2008/0151622 A1 | 6/2008 | Qawami et al. | |
| 2008/0262760 A1* | 10/2008 | Sakurai | G06F 13/4045 702/58 |
| 2016/0328156 A1* | 11/2016 | Swarbrick | G06F 13/4234 |

FOREIGN PATENT DOCUMENTS

KR 1020020084725 11/2002

\* cited by examiner

*Primary Examiner* — Guy J Lamarre
(74) *Attorney, Agent, or Firm* — IP & T Group LLP

(57) ABSTRACT

A memory module includes: a front interface suitable for performing a serial-to-parallel conversion of a command, an address, and data that are received from a host memory controller; a module controller suitable for communicating with the host memory controller through the front interface; and a memory device suitable for receiving the command and the address from the module controller and transferring and receiving data to and from the module controller. The number of lines for transferring the command, the address, and the data between the host memory controller and the front interface is greater than the number of lines for transferring the command, the address, and the data between the module controller and the memory device.

20 Claims, 3 Drawing Sheets

MEMORY MODULE AND METHOD SYSTEM INCLUDING THE SAME

CROSS-REFERENCE TO RELATED APPLICATIONS

The present application claims priority to Korean Patent Application No. 10-2016-0122936, filed on Sep. 26, 2016, which is herein incorporated by reference in its entirety.

BACKGROUND

1. Field

Exemplary embodiments of the present invention relate to a memory module, and a memory system including the memory module.

2. Description of the Related Art

As the use of mobile communication devices such as smart phones and tablet Personal Computers (PCs) becomes popular, and the number of people having access to a Social Network Service (SNS), a Machine-to-Machine (M2M), and a sensor network is increasing, the amount of data, the rate at which the data is generated, and the diversity of the data are increasing geometrically.

In order to process a large amount of data, it is important to increase the data rate of a memory. Additionally, it is necessary to increase the capacity of a memory device and the capacity of a memory module including the memory device.

SUMMARY

Embodiments of the present invention are directed to a technology that may simplify the structure of a memory module and reduce power consumption.

In accordance with an embodiment of the present invention, a memory module includes: a front interface suitable for performing a serial-to-parallel conversion of a command, an address, and data that are received from a host memory controller; a module controller suitable for communicating with the host memory controller through the front interface; and a memory device suitable for receiving the command and the address from the module controller and transferring and receiving data to and from the module controller. The number of lines for transferring the command, the address, and the data between the host memory controller and the front interface is greater than the number of lines for transferring the command, the address, and the data between the module controller and the memory device.

The module controller may further perform n error correction operation.

The front interface may perform a parallel-to-serial conversion of the data that is to be transferred to the host memory controller.

An operation frequency of the module controller and an operation frequency of the memory device may be 1/N of an operation frequency of the host memory controller, where N is an integer that is equal to or greater than 2.

The front interface may perform a serial-to-parallel conversion in 1:N of the command and the address that are received from the host memory controller. The number of the lines for transferring the command and the address between the module controller and the memory device may be N times as many as the number of the lines for transferring the command and the address between the host memory controller and the front interface.

The front interface may perform a serial-to-parallel conversion in 1:2N of the data that is received from the host memory controller, and perform a parallel-to-serial conversion in 2N:1 of the data that is transferred to the host memory controller. The number of the lines for transferring the data between the module controller and the memory device may be 2N times as many as the number of the lines for transferring the data between the host memory controller and the front interface.

The command, the address, and the data may be transferred between the host memory controller and the front interface based on a DDR PHY Interface (DFI) standard interface.

N command signals of the same type among the command may be transferred between the module controller and the memory device. N address signals of the same type among the address may be transferred between the module controller and the memory device.

The front interface may receive a clock from the host memory controller, divide a frequency of the clock into a 1/N frequency, and supply the 1/N frequency to the module controller and the memory device.

The memory module may be a Dual In-dine Memory Module (DIMM).

In accordance with another embodiment of the present invention, a memory system includes: a first command bus; a first address bus; a first data bus; a host memory controller suitable for transferring a command through the first command bus, transferring an address through the first address bus, and transferring and receiving data through the first data bus; a front interface suitable for performing a serial-to-parallel conversion of the command that is received through the first command bus, performing a serial-to-parallel conversion of the address that is received through the first address bus, performing a serial-to-parallel conversion of the data is received through the first data bus, and performing a parallel-to-serial conversion of the data that is to be transferred through the first data bus to the host memory controller; a module controller suitable for communicating with the host memory controller through the front interface; a second command bus; a second address bus; a second data bus; and a memory device suitable for receiving the command from the module controller through the second command bus, receiving the address from the module controller through the second address bus, and transferring and receiving the data to and from the module controller through the second data bus. The second command bus includes more transfer lines than the first command bus, the second address bus includes more transfer lines than the first address bus, and the second data bus includes more transfer lines than the first data bus.

The module controller may further perform an error correction operation.

An operation frequency of the module controller and an operation frequency of the memory device may be 1/N of an operation frequency of the host memory controller, where N is an integer that is equal to or greater than 2.

The front interface may perform a serial-to-parallel conversion in 1:N of the command that is received through the first command bus and the address that is received through the first address bus. The number of lines of the second command bus and the number of lines of the second address bus may be N times as many as the number of lines of the first command bus and the number of lines of the first address bus.

The front interface may perform a serial-to-parallel conversion in 1:2N of the data that is received through the first data bus, and perform a parallel-to-serial conversion in 2N:1 of the data that is transferred through the first command bus. The number of lines of the second data bus may be 2N times as many as the number of lines of the first data bus.

N command signals of the same type among the command may be transferred through the second command bus, and N address signals of the same type among the address may be transferred through the second address bus.

The front interface, the module controller, the second command bus, the second address bus, the second data bus, and the memory device may be included in a memory module of a Dual In-line Memory Module (DIMM) type.

In accordance with yet another embodiment of the present invention, a memory system includes: a first command bus; a first address bus; a plurality of first data buses; a host memory controller suitable for transferring a command through the first command bus, transferring an address through the first address bus, and transferring and receiving data through the first data bus; a front interface suitable for performing a serial-to-parallel conversion of the command that is received through the first command bus, performing a serial-to-parallel conversion of the address that is received through the first address bus, performing a serial-to-parallel conversion of the data that is received through the plurality of the first data buses, and performing a parallel-to-serial conversion of the data that is to be transferred through the plurality of the first data buses to the host memory controller; a module controller suitable for communicating with the host memory controller through the front interface; a second command bus; a second address bus; a plurality of second data buses that correspond to the plurality of the first data buses in 1:1; and a plurality of memory devices suitable for receiving the command from the module controller through the second command bus, receiving the address from the module controller through the second address bus, and transferring and receiving the data to and from the module controller through a second data bus corresponding thereto among the plurality of the second data buses. The second command bus includes more transfer lines than the first command bus, the second address bus includes more transfer lines than the first address bus, and each of the plurality of the second data buses includes more transfer lines than each of the plurality of the first data buses.

The module controller may further perform an error correction operation.

The memory system may further include: an error correction code data bus; and an error correction code memory device, wherein the error correction code memory device receives the command from the module controller through the second command bus receives the address from the module controller through the second address bus, and transfers and receives an error correction code to and from the module controller through the error correction code data bus.

DETAILED DESCRIPTION

Figure 1:
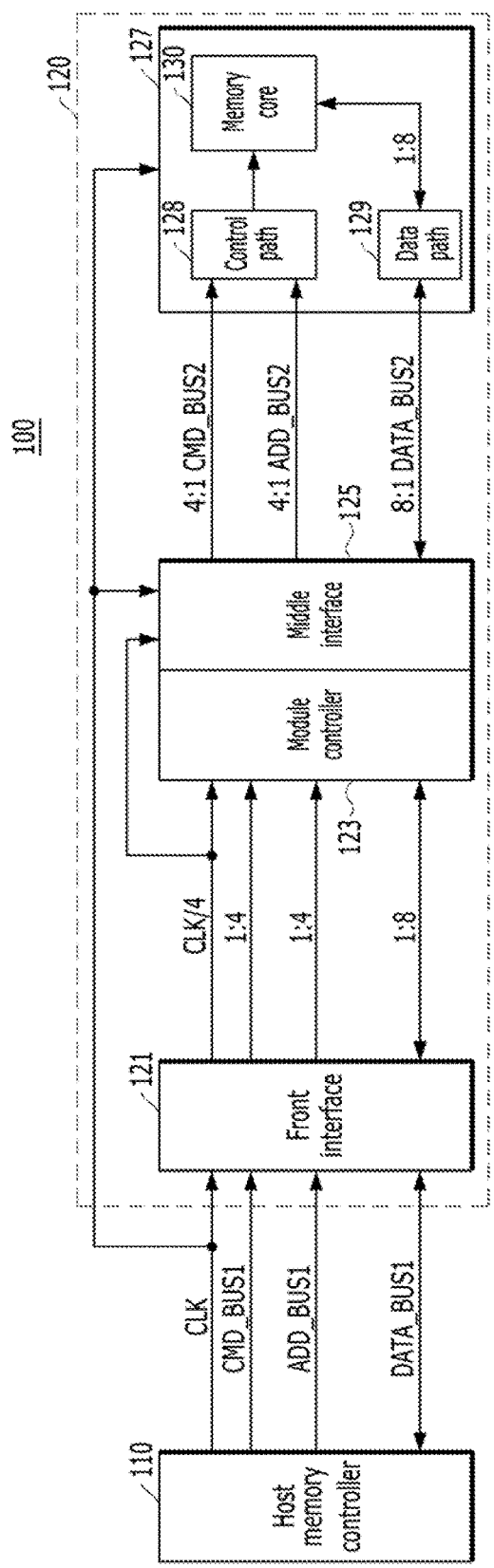
FIG. 1 is a block diagram illustrating a memory system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram illustrating a memory system 100 in accordance with an embodiment of the present invention.

Referring to FIG. 1, the memory system 100 may include a host memory controller 110 and a memory module 120.

The host memory controller 110 may transfer a command to the memory module 120 through a first command bus CMD_BUS1, and transfer an address to the memory module 120 through a first address bus ADD_BUS1. Furthermore, the host memory controller 110 may transfer and receive data to and from the memory module 120 through a first data bus DATA_BUS1. The host memory controller 110 may control the memory module 120 by applying a command and an address to the memory module 120. During a write operation, the host memory controller 110 may transfer data to be programmed in the memory module 120. During a read operation, the host memory controller 110 may receive data to be read from the memory module 120. Additionally, the host memory controller 110 may transfer a dock CLK to be used in the memory module 120. The signal transfer between the host memory controller 110 and the memory module 120 may be performed based on DDR PHY Interface (DFI) Standard Protocol.

The memory module 120 may include a front interface 121, a module controller 123, a middle interface 125, and a memory device 127. The memory module 120 may be a Dual n-line Memory Module (DIMM).

The front interface 121 may receive a command through the first command bus CMD_BUS1 receive an address through the first address bus ADD_BUS1, and transfer and receive data through the first data bus DATA_BUS1. Additionally, the front interface 121 may receive a clock CLK. The front interface 121 may perform a serial-to-parallel conversion in 1:4 of the command that is received through the first command bus CMD_BUS1, and perform a serial-to-parallel conversion in 1:4 of the address that is received through the first address bus ADD_BUS1. The front interface 121 may perform a serial-to-parallel conversion in 1:8 of the data that is received through the first data bus DATA_BUS1 and perform a parallel-to-serial conversion in 8:1 of the data that is to be transferred through the first data bus DATA_BUS1. Moreover, the front interface 121 may generate a divided clock CLK/4 having a quarter of the frequency of the clock CLK by dividing the clock CLK. The module controller 123 operating at a low frequency is used to decrease the production cost. To this end, the front interface 121 may perform a serial-to-parallel conversion in 1:4 of the command and the address. Furthermore, the data is transferred and received twice during one cycle of the clock CLK in the DDR scheme over the first data bus DATA_BUS1. Since the module controller 123 transfers and receives data only once during one cycle of the divided clock CLK/4, the data may be converted into parallel data in 1:8. The front interface 121 is referred to as a front PHY. In the drawing, 'CMD 1:4' and 'ADD 1:4' may represent that the front interface 121 performs a 1:4 serial-to-parallel conversion of the command and the address. Additionally, 'DATA 1:8' may represent that the front interface 121 performs a 1:8 serial-to-parallel conversion of the data.

The module controller 123 may correct an error of at least one between the data to be programmed in the memory device 127 and the data to be read from the memory device 127. To process big data, the cost for the memory module 20 has to be reduced while increasing the capacity of the memory module 120. Therefore, a low-cost low-quality memory device with a large capacity has to be used as the memory device 127. Moreover, to decrease the amount of current that is consumed by the memory device 127 with high-capacity, the refresh cycle of the memory device 127 has to be elongated. Accordingly, many errors may occur in the memory device 127. The module controller 123 may be used to correct the errors. The module controller 123 may operate in synchronization with the divided clock CLK/4. The module controller 123 may communicate with the memory device 127 through the middle interface 125.

The middle interface 125 may receive the command from the module controller 123, perform a 4:1 parallel-to-serial conversion of the command, and transfer the resultant command to a second command bus CMD_BUS2. Further, the middle interface 125 may receive the address from the module controller 123, perform a 4:1 parallel-to-serial conversion of the address, and transfer the resultant address to a second address bus ADD_BUS2. Also, the middle interface 125 may receive the data from the module controller 123, perform an 8:1 parallel-to-serial conversion of the data, and transfer the resultant data to a second data bus DATA_BUS2. Further, the middle interface 125 may receive the data from the second data bus DATA_BUS2, perform a 1:8 serial-to-parallel conversion of the data, and transfer the resultant data to the module controller 123. That is, the middle interface 125 may perform an operation that is opposite to the operation of the front interface 121 so that the memory device 127 may operate using the same interface as that of the host memory controller 110. The clock CLK and the divided dock CLK/4 may be used for the operation of the middle interface 125. The second command bus CMD_BUS2 may include the same number of transfer lines as the first command bus CMD_BUS1, and the second address bus ADD_BUS2 may include the same number of transfer lines as the first address bus ADD_BUS1. The second data bus DATA_BUS2 may include the same number of transfer lines as the first data bus DATA_BUS1. In the drawing, '4:1' may represent that the middle interface 125 performs a 4:1 parallel-to-serial conversion of the command and the address, and '8:1' may represent that the middle interface 125 performs an 8:1 parallel-to-serial conversion of the data.

The memory device 127 may be controlled based on the command of the second command bus CMD_BUS2 and the address of the second address bus ADD_BUS2, and the memory device 127 may transfer and receive data through the second data bus DATA_BUS2. The memory device 127 may be a Dynamic Random Access Memory (DRAM) device. The memory device 127 may include a control path 128, a data path 129, and a memory core 130. The control path 128 may receive the command and the address and control the diverse operations of the memory core 130, such as a read operation and a write operation. The data path 129 may perform a 1:8 serial-to-parallel conversion of the data that is received from the second data bus DATA_BUS2 and transfer the resultant data to the memory core 130 during a write operation. During a read operation, the data path 129 may perform an 8:1 parallel-to-serial conversion of the data that is read from the memory core 130 and transfer the resultant data to the second data bus DATA_BUS2. Since it is technically difficult to increase the operation rate of the memory core 130 in the memory device 127 due to physical limitation, the physical limitation in the operation rate of the memory core 130 is overcome by raising the data input/output rate and processing the data in parallel in the memory core 130. For this reason, the data path 129 may perform a 1:8 serial-to-parallel conversion of the received data and transfer the resultant data to the memory core 130. The memory device 127 may operate in synchronization with the clock CLK.

Figure 2:
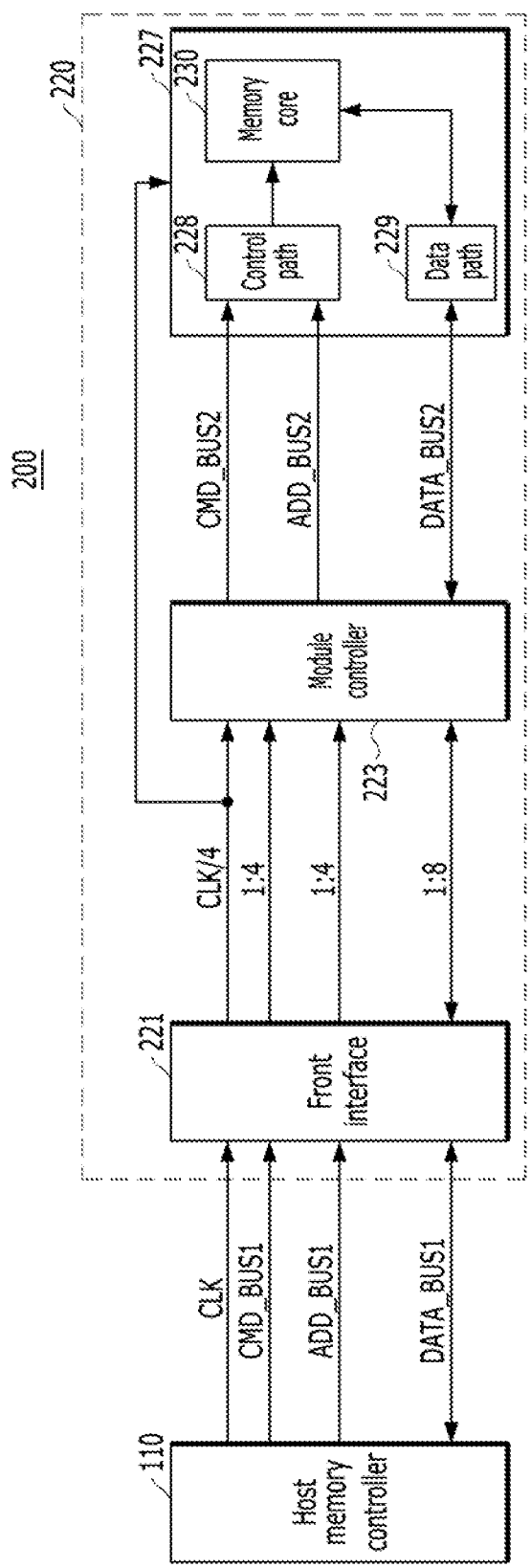
FIG. 2 is a block diagram illustrating a memory system in accordance with another embodiment of the present invention.

FIG. 2 is a block diagram illustrating a memory system 200 in accordance with another embodiment of the present invention.

Referring to FIG. 2, the memory system 200 may include a host memory controller 110 and a memory module 220.

The host memory controller 110 may transfer a command to the memory module 220 through a first command bus CMD_BUS1, and transfer an address to the memory module 220 through a first address bus ADD_BUS1. Also, the host memory controller 110 may transfer and receive data to and from the memory module 220 through a first data bus DATA_BUS1. The host memory controller 110 may control the memory module 220 by applying a command and an address to the memory module 220. During a write operation, the host memory controller 110 may transfer data to be programmed in the memory module 220. During a read operation, the host memory controller 110 may receive data to be read from the memory module 220. Furthermore, the host memory controller 110 may transfer a clock CLK to be used in the memory module 220. The signal transfer between the host memory controller 110 and the memory module 220 may be performed based on DDR PHY Interface (DFI) Standard Protocol.

The memory module 220 may include a front interface 221, a module controller 223 and a memory device 227. The memory module 220 may be a Dual In-line Memory Module (DIMM).

The front interface 221 may receive a command through the first command bus CMD_BUS1 receive an address through the first address bus ADD_BUS1, and transfer and receive data through the first data bus DATA_BUS1. Also, the front interface 221 may receive a clock CLK. The front interface 22 may perform a serial-to-parallel conversion in 1:4 of the command that is received through the first command bus CMD_BUS1, and perform a serial-to-parallel conversion in 1:4 of the address that is received through the first address bus ADD_BUS1. Also, the front interface 221 may perform a serial-to-parallel conversion in 1:8 of the data that is received through the first data bus DATA_BUS1 and perform a parallel-to-serial conversion in 8:1 of the data that is to be transferred through the first data bus DATA_BUS1. Further, the front interface 221 may generate a divided dock CLK/4 having a quarter of the frequency of the dock CLK by dividing the clock CLK. The module controller 223 operating at a low frequency is used to decrease the production cost. Accordingly, the front interface 221 may perform a serial-to-parallel conversion in 1:4 of the command and the address. The data is transferred and received twice during one cycle of the clock CLK in the DDR scheme over the first data bus DATA_BUS1. Since the module controller 223 transfers and receives data only once during one cycle of the divided clock CLK/4, the data may be converted into parallel data in 1:8. The front interface 221 is referred to as a front PHY. In the drawing, 'CMD 1:4' and 'ADD 1:4' may represent that the front interface 221 performs a 1:4 serial-to-parallel conversion of the command and the address. Also 'DATA 1:8' may represent that the front interface 221 performs a 1:8 serial-to-parallel conversion of the data.

The module controller 223 may correct an error of at least one between the data to be programmed in the memory device 227 and the data to be read from the memory device 227. To process large volumes of data, the cost for the memory module 220 has to be reduced while increasing the capacity of the memory module 220. Therefore, a low-cost low-quality memory device with a large capacity has to be used as the memory device 227. Also, in order to decrease the amount of current that is consumed by the memory device 227 with high-capacity, the refresh cycle of the memory device 227 has to be elongated. Accordingly, many errors may occur in the memory device 227. The module controller 223 may be used to correct the errors. The module controller 223 may operate in synchronization with the divided dock CLK/4. The module controller 223 may communicate directly with the memory device 227, which is different from the module controller 123 of FIG. 1.

The module controller 223 may not perform a parallel-to-serial conversion of the command, the address, and the data that are transferred from the front interface 221 and transfer them to the memory device 227 as they are. The module controller 223 may transfer the command to the memory device 227 through a second command bus CMD_BUS2, and may transfer the address to the memory device 227 through a second address bus ADD_BUS2. Additionally, the module controller 223 may transfer and receive the data to and from the memory device 227 through a second data bus DATA_BUS2.

Since the command loaded on the second command bus CMD_BUS2 is a command that is serial-to-parallel converted in 1:4, compared with the command loaded on the first command bus CMD_BUS1, the number of the transfer lines of the second command bus CMD_BUS2 may be four times as many as the number of the transfer lines of the first command bus CMD_BUS1. Also, four command signals of the same type may be transferred. For example, when the first command bus CMD_BUS1 includes five transfer lines, and each of the transfer lines transfers any one signal among a chip select signal CS, an active signal ACT, a row address strobe signal RAS, a column address strobe signal CAS, and a write enable signal WE, the second command bus CMD_BUS2 may include 20 transfer lines and transfer four signals of the same type through each transfer line.

Since the address loaded on the second address bus ADD_BUS2 is an address that is serial-to-parallel converted in 1:4, compared with the address loaded on the first address bus ADD_BUS1, the number of the transfer lines of the second address bus ADD_BUS2 may be four times as many as the number of the transfer lines of the first address bus ADD_BUS1. Furthermore, four address signals of the same kind may be transferred. For example, when the first address bus ADD_BUS1 includes 20 transfer lines and each of the transfer lines transfers any one signal among 0 to $19^{th}$ address signals, the second address bus ADD_BUS2 may include 80 transfer lines and transfer address signals of the same number through four transfer lines.

Since the data loaded on the second data bus DATA_BUS2 is data that is serial-to-parallel converted in 1:8, compared with the data loaded on the first data bus DATA_BUS1, the number of the transfer lines of the second data bus DATA_BUS2 may be eight times as many as the number of the transfer lines of the first data bus DATA_BUS1. Also, four address signals of the same type may be transferred. For example, when the first data bus DATA_BUS1 includes 8 lines, the second data bus DATA_BUS2 may include 64 lines. Additionally, whereas two data are loaded on the first data bus DATA_BUS1 during one cycle of the clock CLK, one data may be loaded on the second data bus DATA_BUS2 during one cycle of the divided clock CLK/4.

The memory device 227 may be controlled based on the command of the second command bus CMD_BUS2 and the address of the second address bus ADD_BUS2, and the memory device 227 may transfer and receive data through the second data bus DATA_BUS2. The memory device 227 may be a Dynamic Random. Access Memory (DRAM) device. The memory device 227 may have input terminals for receiving the command and the address four times as many as those of the memory device 127, and input terminals for receiving data eight times as many as those of the memory device 127. The memory device 227 may operate in synchronization with the divided clock CLK/4 and include a control path 228, a data path 229, and a memory core 230. The control path 228 may receive the command and the address and control diverse operations of the memory core 230, such as a read operation and a write operation. The data path 229 may transfer the data that is received from the second data bus DATA_BUS2 to the memory core 230 during a write operation. During a read operation, the data path 229 may transfer the data that is read from the memory core 230 to the second data bus DATA_BUS2. Since the data path 229 receives the data that are already parallelized from the second data bus DATA_BUS2 during the write operation, the data path 229 does not have to perform the serial-to-parallel conversion operation, which is different from the data path 129. Also, since the data path 229 transfers the parallel data that are read from the memory core 230 to the second data bus DATA_BUS2 as they are during the read operation, the data path 229 does not have to perform the parallel-to-serial conversion operation, which is also different from the data path 129. That is, the memory device 227 does not have to include a structure for performing a serial-to-parallel conversion or a parallel-to-serial conversion on data, which may lead to reduction in the production cost.

Since the memory device 227 operates in synchronization with the divided clock CLK/4, the memory device 227 may transfer and receive the command, the address, and the data at a relatively slower rate than the memory device 127 which operates in synchronization with the clock CLK. Since the memory device 227 transfers and receives more parallelized command, address and data, it is possible to maintain the amount of the command, the address, and the data that are transferred and received per hour at the same level. Also, since the memory core 230 of the memory device 227 operates at the operation rate according to the physical limitation of the memory core 230 regardless of the operation frequency, there is little difference in the operation rate of the memory device 227 and the operation rate of the memory device 127.

In summary, the memory module 220 shown in FIG. 2 may exclude the middle interface 125 which is necessary in the memory module 120 shown in FIG. 1, and also, it is possible to exclude the structure for performing a serial-to-parallel conversion or a parallel-to-serial conversion from the constituent elements of the memory device 227. The memory device 227 may operate at a low frequency. Therefore, the memory module 220 may have reduced power consumption and production cost, compared with the memory module 120.

Although it is illustrated in FIG. 2 that the front interface 221 performs a 1:4 serial-to-parallel conversion on the command and the address and performs a 1:8 serial-to-parallel conversion on the data since the frequency of the divided clock CLK/4 is a quarter of the frequency of the clock CLK, this is a mere example, and the ratio may be changed diversely. For example, when the frequency of the divided clock CLK/N is 1/N of the frequency of the clock CLK (where N is an integer that is equal to or greater than '2'), the front interface 221 may perform a 1:N serial-to-parallel conversion on the command and the address, and perform a 1:2N serial-to-parallel, conversion on the command and the data.

Figure 3:
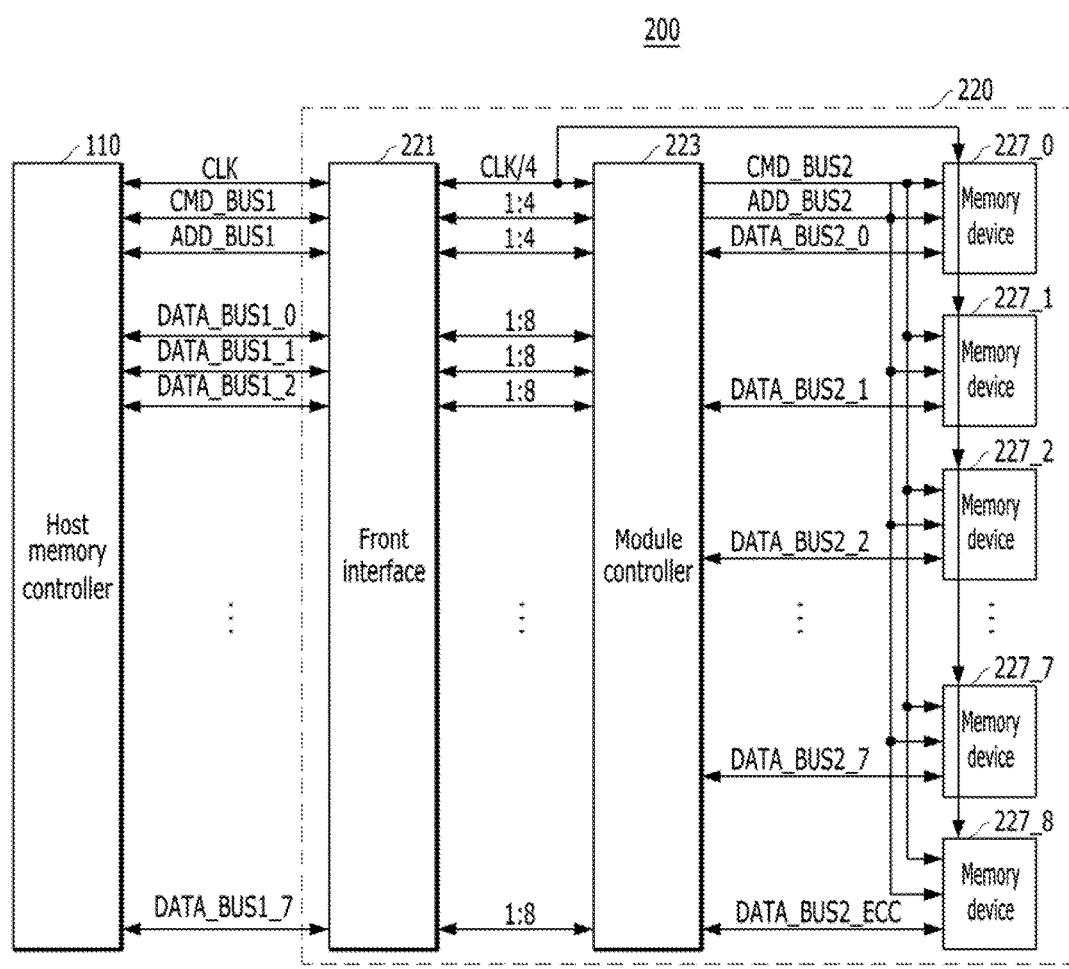
FIG. 3 is a block diagram illustrating the memory system of FIG. 2 including a memory module provided with a plurality of memory devices.

FIG. 3 is a block diagram illustrating the memory system 200 of FIG. 2 including the memory module 220 provided with a plurality of memory devices 227_0 to 227_8. Although the memory module 220 is described to have one memory device 227 in FIG. 2 to simplify the description of the embodiment of the present invention, the memory module 220 may generally include a plurality of memory devices 227_0 to 227_8, as shown in FIG. 3.

Referring to FIG. 3, the memory system 200 may include the host memory controller 110 and the memory module 220.

Although the number of the memory devices 227_0 to 227_8 of the memory module 220 is increased, the number of the first command bus CMD_BUS1 and the number of the first address bus ADD_BUS1 do not have to increase. The number of the first data bus DATA_BUS1_0 to DATA_BUS1_7 may be increased, though. Additionally, the number of second data buses DATA_BUS2_0 to DATA_BUS2_7 may be increased the same as the number of the first data bus DATA_BUS1_0 to DATA_BUS1_7. The second data buses DATA_BUS2_0 to DATA_BUS2_7 may respectively correspond to, the first data bus DATA_BUS1_0 to DATA_BUS1_7 in 1:1, and may transfer the same data. For example, data that is transferred to the front interface 221 through the first data bus DATA_BUS1_3 may be transferred to the memory device 227_3 through the second data bus DATA_BUS2_3.

The memory devices 227_0 to 227_8 may share the second command bus CMD_BUS2 and the second address bus ADD_BUS2. That is, the memory devices 227_0 to 227_8 may operate by receiving the same command and the same address. The second data buses DATA_BUS2_0 to DATA_BUS2_7 of the memory devices 227_0 to 227_8 are not shared, the memory devices 227_0 to 227_8 may transfer and receive data to and from the second data bus corresponding thereto.

The memory device 227_8 may be a memory device for storing an error correction code for correcting an error of the data that are stored in the memory devices 227_0 to 227_7. The memory device 227_8 may transfer and receive an error correction code to and from the module controller 223 through an error correction code data bus DATA_BUS2_ECC under the control of the second command bus CMD_BUS2 and the second address bus ADD_BUS2. The error correction code generated in the module controller 223 may be stored in the memory device 227_8 during a write operation, and during a read operation the error correction code stored in the memory device 227_8 may be transferred to the module controller 223. The module controller 223 may sense an error by using the error correction code and correct the sensed error.

According to the embodiments of the present invention the structure of a memory module may be simplified and the power consumption may be reduced.

While the present invention has been described with respect to specific embodiments, it will be apparent to those skilled in the art that various changes and modifications may be made without departing from the spirit and scope of the invention a defined in the following claims.

What is claimed is:

1. A memory module, comprising:
    a front interface suitable for performing a serial-to-parallel conversion of a command, an address, and data that are received from a host memory controller;
    a module controller suitable for communicating with the host memory controller through the front interface; and
    a memory device suitable for operating in synchronization with a divided clock, receiving the command and the address from the module controller, and transferring and receiving data to and from the module controller once during one cycle of the divided clock,
    wherein the number of lines for transferring the command, the address, and the data between the host memory controller and the front interface is greater than the number of lines for transferring the command, the address, and the data between the module controller and the memory device.

2. The memory module of claim 1, wherein the module controller further performs an error correction operation.

3. The memory module of claim 1, wherein the front interface further performs a parallel-to-serial conversion of the data that is to be transferred to the host memory controller.

4. The memory module of claim 3, wherein an operation frequency of the module controller and an operation frequency of the memory device are 1/N of an operation frequency of the host memory controller, where N is an integer that is equal to or greater than 2.

5. The memory module of claim 4, wherein the front interface performs a serial-to-parallel conversion in 1:N of the command and the address that are received from the host memory controller, and
    wherein the number of the lines for transferring the command and the address between the module controller and the memory device is N times as many as the number of the lines for transferring the command and the address between the host memory controller and the front interface.

6. The memory module of claim 5, wherein the front interface performs a serial-to-parallel conversion in 1:2N of the data that is received from the host memory controller, and performs a parallel-to-serial conversion in 2N:1 of the data that is transferred to the host memory controller, and
    wherein the number of the lines for transferring the data between the module controller and the memory device is 2N times as many as the number of the lines for transferring the data between the host memory controller and the front interface.

7. The memory module of claim 4, wherein the command, the address, and the data are transferred between the host memory controller and the front interface based on a DDR PHY Interface (DFI) standard interface.

8. The memory module of claim 7, wherein N command signals of the same type among the command are transferred between the module controller and the memory device, and N address signals of the same type among the address are transferred between the module controller and the memory device.

9. The memory module of claim 4, wherein the front interface receives a clock from the host memory controller, divides a frequency of the clock into a 1/N frequency, and supplies the 1/N frequency to the module controller and the memory device.

10. The memory module of claim 1, wherein the memory module is a Dual In-line Memory Module (DIMM).

11. A memory system, comprising:
a first command bus;
a first address bus;
a first data bus;
a host memory controller suitable for transferring a command through the first command bus, transferring an address through the first address bus, and transferring and receiving data through the first data bus;
a front interface suitable for performing a serial-to-parallel conversion of the command that is received through the first command bus, performing a serial-to-parallel conversion of the address that is received through the first address bus, performing a serial-to-parallel conversion of the data that is received through the first data bus, and performing a parallel-to-serial conversion of the data that is to be transferred through the first data bus to the host memory controller;
a module controller suitable for communicating with the host memory controller through the front interface;
a second command bus;
a second address bus;
a second data bus; and
a memory device suitable for operating in synchronization with a divided clock, receiving the command from the module controller through the second command bus, receiving the address from the module controller through the second address bus, and transferring and receiving the data to and from the module controller through the second data bus once during one cycle of the divided clock,
wherein the second command bus includes more transfer lines than the first command bus, the second address bus includes more transfer lines than the first address bus, and the second data bus includes more transfer lines than the first data bus.

12. The memory system of claim 11, wherein the module controller further performs an error correction operation.

13. The memory system of claim 11, wherein an operation frequency of the module controller and an operation frequency of the memory device are 1/N of an operation frequency of the host memory controller, where N is an integer that is equal to or greater than 2.

14. The memory system of claim 13, wherein the front interface performs a serial-to-parallel conversion in 1:N of the command that is received through the first command bus and the address that is received through the first address bus, and
wherein the number of lines of the second command bus and the number of lines of the second address bus are N times as many as the number of lines of the first command bus and the number of lines of the first address bus.

15. The memory system of claim 14, wherein the front interface performs a serial-to-parallel conversion in 1:2N of the data that is received through the first data bus, and performs a parallel-to-serial conversion in 2N:1 of the data that is transferred through the first command bus, and wherein the number of lines of the second data bus is 2N times as many as the number of the lines of the first data bus.

16. The memory system of claim 13, wherein N command signals of the same type among the command are transferred through the second command bus, and
N address signals of the same type among the address are transferred through the second address bus.

17. The memory system of claim 1, wherein the front interface, the module controller, the second command bus, the second address bus, the second data bus, and the memory device are included in a memory module of a Dual In-line Memory Module (DIMM) type.

18. A memory system, comprising:
a first command bus;
a first address bus;
a plurality of first data buses;
a host memory controller suitable for transferring a command through the first command bus, transferring an address through the first address bus, and transferring and receiving data through the first data bus;
a front interface suitable for performing a serial-to-parallel conversion of the command that is received through the first command bus, performing a serial-to-parallel conversion of the address that is received through the first address bus, performing a serial-to-parallel conversion of the data that is received through the plurality of the first data buses, and performing a parallel-to-serial conversion of the data that is to be transferred through the plurality of the first data buses to the host memory controller;
a module controller suitable for communicating with the host memory controller through the front interface;
a second command bus;
a second address bus;
a plurality of second data buses that correspond to the plurality of the first data buses in 1:1; and
a plurality of memory devices suitable for operating in synchronization with a divided clock, receiving the command from the module controller through the second command bus, receiving the address from the module controller through the second address bus, and transferring and receiving the data to and from the module controller through a second data bus corresponding thereto among the plurality of the second data buses once during one cycle of the divided clock,
wherein the second command bus includes more transfer lines than the first command bus, the second address bus includes more transfer lines than the first address bus, and each of the plurality of the second data buses includes more transfer lines than each of the plurality of the first data buses.

19. The memory system of claim 18, wherein the module controller further performs an error correction operation.

20. The memory system of claim 19, further comprising:
an error correction code data bus; and
error correction code memory device,
wherein the error correction code memory device receives the command from the module controller through the second command bus, receives the address from the module controller through the second address bus, and transfers and receives an error correction code to and from the module controller through the error correction code data bus.

* * * * *